(12) United States Patent
Ariga

(10) Patent No.: US 9,571,750 B2
(45) Date of Patent: Feb. 14, 2017

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Yuichi Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/742,327

(22) Filed: Jun. 17, 2015

(65) Prior Publication Data

US 2015/0373249 A1 Dec. 24, 2015

(30) Foreign Application Priority Data

Jun. 19, 2014 (JP) ................................. 2014-126585

(51) Int. Cl.
| | | |
|---|---|---|
| *H04N 5/235* | (2006.01) | |
| *H04N 5/353* | (2011.01) | |
| *H04N 5/374* | (2011.01) | |
| *H04N 5/3745* | (2011.01) | |

(52) U.S. Cl.
CPC .......... *H04N 5/2357* (2013.01); *H04N 5/3353* (2013.01); *H04N 5/3532* (2013.01); *H04N 5/3745* (2013.01)

(58) Field of Classification Search
CPC .. H04N 5/2353; H04N 5/2357; H04N 5/3532; H04N 5/3475; H04N 9/68; G03B 9/36
USPC ............ 348/226.1, 340, 234, 374, 362, 300, 348/222.1, 296, 297, 298, 367, 301–305; 396/479, 456, 480, 481
See application file for complete search history.

(56) References Cited

U.S. PATENT DOCUMENTS

| | | | | |
|---|---|---|---|---|
| 7,864,242 | B2 * | 1/2011 | Namai | G03B 9/08 348/296 |
| 7,893,986 | B2 * | 2/2011 | Butterworth | G02B 13/0015 348/234 |
| 8,723,983 | B2 * | 5/2014 | Shiohara | H04N 5/217 348/221.1 |
| 2006/0087573 | A1 * | 4/2006 | Harada | H04N 5/2352 348/294 |
| 2008/0152335 | A1 * | 6/2008 | Sakai | G03B 7/10 396/256 |

(Continued)

FOREIGN PATENT DOCUMENTS

| | | |
|---|---|---|
| JP | 2007-053742 A | 3/2007 |
| JP | 2008-236808 A | 10/2008 |

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image capturing apparatus includes a detection unit that detects brightness of light from an object, an XY addressing type of image sensor, a focal plane shutter having a mechanical second curtain shutter, an electronic first curtain shutter that resets the pixels in each line, and causes accumulation of charges in the pixels to start, a period detection unit that detects periodic variation in a light amount, a prediction unit that, based on the period of the variation in the light amount, predicts variation in the light amount in a predetermined exposure time, and a control unit that controls a reset time of the electronic first curtain shutter such that charge accumulation amounts of the pixels of each line fall within a predetermined range according to the variation in the light amount.

16 Claims, 7 Drawing Sheets

(56) References Cited

U.S. PATENT DOCUMENTS

| | | | | |
|---|---|---|---|---|
| 2009/0213233 A1* | 8/2009 | Kido | ............... | G03B 7/093 |
| | | | | 348/208.4 |
| 2010/0091158 A1* | 4/2010 | Yamashita | ............ | H04N 5/353 |
| | | | | 348/300 |
| 2010/0295954 A1* | 11/2010 | Kotani | ................. | G06T 5/003 |
| | | | | 348/208.4 |
| 2010/0321509 A1* | 12/2010 | Torii | ................. | G03B 17/00 |
| | | | | 348/208.4 |
| 2011/0050946 A1* | 3/2011 | Lee | ................. | G03B 9/40 |
| | | | | 348/222.1 |
| 2014/0049664 A1* | 2/2014 | Lee | ................. | G03B 9/40 |
| | | | | 348/229.1 |

* cited by examiner

IMAGE CAPTURING APPARATUS, METHOD FOR CONTROLLING THE SAME, AND STORAGE MEDIUM

BACKGROUND OF THE INVENTION

Field of the Invention

The present invention relates to a technique for correcting unevenness of exposure caused by external light variation (generally referred to as "flicker") that occurs when an image capturing apparatus performs shooting.

Description of the Related Art

Accompanying an increase in the sensitivity of digital cameras in recent years, high-speed shutters have been released also in environments using artificial light sources in which flicker occurs. When a high-speed shutter is released in an environment using a flicker light source, variation occurs in the exposure of each frame during continuous shooting due to variation in the external light. Also, if the brightness of the light source varies within one frame during this time, unevenness of exposure will occur in upper and lower portions of the image. Regarding this kind of problem, for example, a method has been proposed in which the gain of the image is raised or lowered after shooting so as to adjust the exposure.

Japanese Patent Laid-Open No. 2008-236808 discloses a shooting system in which exposure is started by resetting all of the pixels of an image sensor at the time of still image shooting, and exposure is stopped by closing a lens shutter. Also, unevenness of exposure is prevented by controlling a program line diagram in advance such that shooting is performed at an exposure time at which unevenness of exposure caused by flicker is not likely to occur.

Japanese Patent Laid-Open No. 2007-053742 discloses a shooting apparatus that shoots a still image using a combination of a focal-plane mechanical second curtain shutter that suspends exposure and an electronic first curtain shutter that travels to start exposure before the mechanical second curtain shutter suspends exposure. Also, a mechanism is described which corrects unevenness of exposure that appears in an image due to this kind of combination of an electronic shutter and a mechanical shutter.

However, if the exposure is adjusted by changing the gain of the image after shooting, blown-out highlights will appear in bright portions, and the S/N ratio will deteriorate in dark portions. Also, if control is performed such that unevenness of exposure caused by flicker does not occur in the program line diagram as disclosed in Japanese Patent Laid-Open No. 2008-236808, it will no longer be possible for a user to perform shooting using an intended shutter speed and diaphragm value as if shooting using a single-lens reflex camera. Also, with the shooting system disclosed in Patent Document 1, in which exposure is started by resetting all of the pixels in an image sensor once during still image shooting and exposure is suspended by closing the lens shutter, there is no mention of unevenness that appears in the top and bottom portions of an image captured using a focal plane shutter.

In Japanese Patent Laid-Open No. 2007-053742, regarding the unevenness of exposure that appears due to the combination of the electronic first curtain shutter and the mechanical second curtain shutter, the travel curve of the electronic first curtain shutter is corrected using parameters determined as shooting conditions, such as the exit pupil distance (PO value) of the lens. For this reason, the unevenness of exposure caused by flicker cannot be corrected.

SUMMARY OF THE INVENTION

The present invention has been made in view of the problem to be solved, and provides an image capturing apparatus capable of effectively correcting unevenness of exposure caused by flicker.

According to a first aspect of the present embodiment, there is provided an image capturing apparatus, comprising: a detection unit configured to detect brightness of light from an object; an XY addressing type of image sensor having a plurality of pixels; a focal plane shutter having a mechanical second curtain shutter configured to perform shielding such that light reception in the pixels of the image sensor is suspended in sequence; an electronic first curtain shutter configured to reset the pixels in each line in sequence before the mechanical second curtain shutter travels, and to cause accumulation of charges in the pixels to start; a period detection unit configured to detect periodic variation in a light amount by sampling light from the object for a certain period of time using the detection unit; a prediction unit configured to, based on the period of the variation in the light amount of light from the object detected by the period detection unit, predict variation in the light amount in a predetermined exposure time; and a control unit configured to control a reset time of the electronic first curtain shutter such that charge accumulation amounts of the pixels of each line fall within a predetermined range according to the variation in the light amount predicted by the prediction unit.

According to a second aspect of the present invention, there is provided an image capturing apparatus comprising: an image sensor; a mechanical shutter; an accumulation control unit configured to cause accumulation of charges to start in each region of the image sensor in sequence, before the mechanical shutter travels in a direction of shielding the image sensor against light; a first detection unit configured to detect brightness of light from an object; and a second detection unit configured to detect periodic variation in a light amount of light from the object based on a result of detection performed by the first detection unit, wherein based on the periodic variation detected by the second detection unit, the accumulation control unit sets the charge accumulation start times for the respective regions of the image sensor such that a region with an exposure time of a different length exists among the plurality of regions in the image sensor.

According to a third aspect of the present invention, there is provided a method for controlling an image capturing apparatus that includes a detection unit configured to detect brightness of external light, an XY addressing type of image sensor having a plurality of pixels, a focal plane shutter having a mechanical second curtain shutter configured to perform shielding such that light reception in the pixels of the image sensor is suspended in sequence, and an electronic first curtain shutter configured to cause accumulation of charges in the pixels to start by resetting the pixels in each line in sequence before the mechanical second curtain shutter travels, the method comprising: a period detection step of detecting periodic variation in a light amount by sampling external light for a certain period of time using the detection unit; a prediction step of, based on the period of the variation in the light amount of the external light detected in the period detection step, predicting variation in the light amount in a predetermined exposure time; and a control step of controlling a reset time of the electronic first curtain shutter such that the charge accumulation amounts of the pixels of each line fall within a predetermined range, according to the variation in the light power of the external light predicted in the prediction step.

According to a fourth aspect of the present invention, there is provided a method for controlling an image capturing apparatus including an image sensor, a mechanical shutter, and an accumulation control unit configured to cause accumulation of charges to start in each region of the image sensor in sequence before the mechanical shutter travels in a direction of shielding the image sensor, the method comprising: detecting brightness of light from the object; detecting periodic variation in a light amount of light from the object based on a result of detecting brightness of light from the object; and setting the charge accumulation start times for each respective region of the image sensor such that a region with an exposure time of a different length exists among the plurality of regions in the image sensor, based on the detected periodic variation.

Further features of the present invention will become apparent from the following description of exemplary embodiments with reference to the attached drawings.

DESCRIPTION OF THE EMBODIMENTS

Hereinafter, an embodiment of the present embodiment will be described in detail with reference to the accompanying drawings. Here, in the present embodiment, a description will be given using an example in which a digital single-lens reflex camera is applied as an image capturing apparatus.

Figure 1:
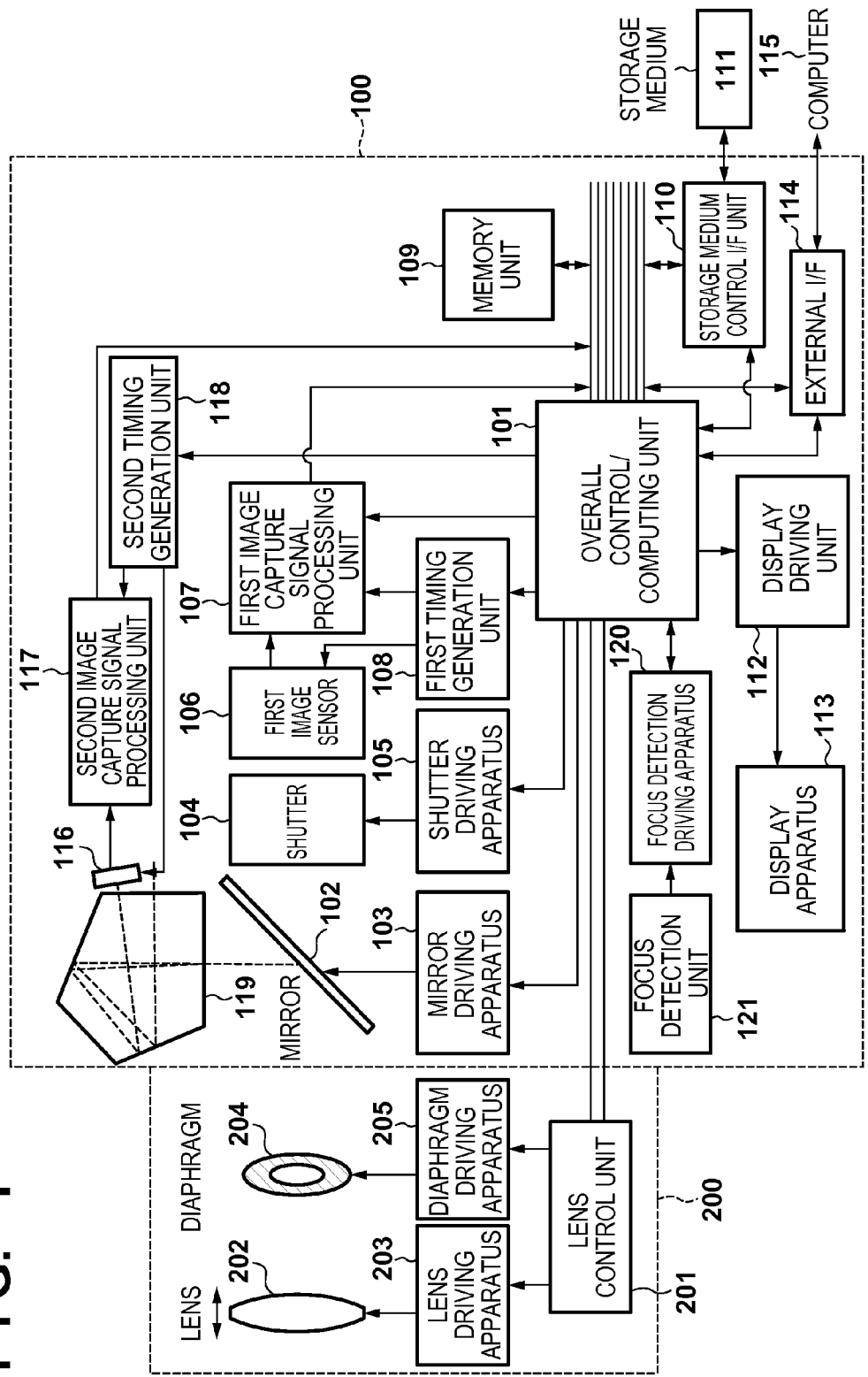
FIG. 1 is a block diagram showing a digital single-lens reflex camera according to an embodiment of the present invention.

FIG. 1 is a block diagram showing an overall configuration of a digital single-lens reflex camera system (image capturing apparatus) according to the present embodiment. In FIG. 1, reference numeral 100 indicates a digital single-lens reflex camera, and reference numeral 200 indicates an interchangeable lens. Also, FIG. 2 is a diagram showing the actual arrangement of the blocks shown in FIG. 1 in the camera.

Figure 2:
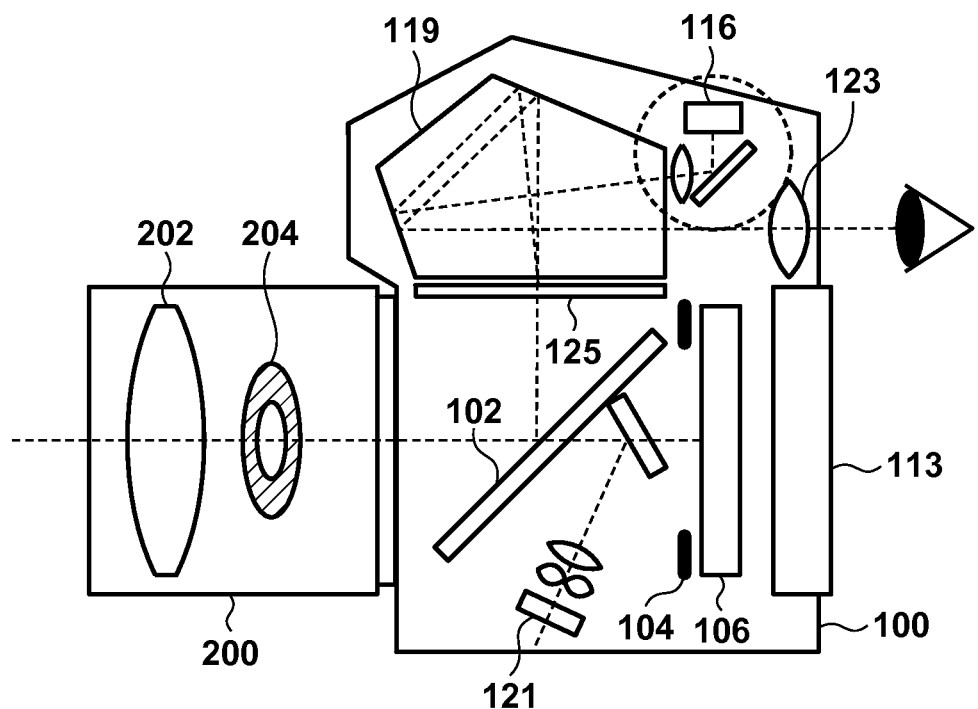
FIG. 2 is a diagram showing an arrangement of blocks in an interchangeable lens and the main body of the camera.

In FIGS. 1 and 2, reference numeral 101 indicates an overall control/computing unit that performs various types of computing processing and performs overall control of the digital single-lens camera 100 and the interchangeable lens 200. Reference numeral 200 indicates an interchangeable lens for a digital single-lens reflex camera, and reference numeral 202 indicates a shooting lens that causes an optical image of a subject to be formed on a first image sensor 106. Reference numeral 203 indicates a driving apparatus that drives the shooting lens so that it is in focus, reference numeral 204 indicates a diaphragm mechanism that controls the amount of reflected light from the subject that passes through the lens, and reference numeral 205 indicates a diaphragm driving apparatus that drives the diaphragm mechanism.

The interchangeable lens 200 for shooting can be removed from the digital single-lens reflex camera 100 in order to be exchanged, and communication for information exchange is performed between the interchangeable lens 200 and the digital single-lens reflex camera 100. Communication in this case is performed by a lens control unit 201 of the interchangeable lens 200 with the overall control/computing unit 101 of the digital single-lens reflex camera 100, and the lens control unit 201 manages transmission and reception.

Reference numeral 100 indicates a digital single-lens reflex camera, which is the main body of the image capturing apparatus, and reference numeral 102 indicates a quick return (QR) mirror. The quick return mirror 102 guides an optical image that has passed through the shooting lens 202 to a finder 123 and a second image sensor 116 for AE (automatic exposure) when using the finder. Also, during shooting, the quick return mirror 102 moves upward so that the optical image is guided to the first image sensor 106. Reference numeral 103 indicates a mirror driving apparatus that drives the quick return mirror 102.

Reference numeral 104 indicates a focal-plane shutter having a first shutter curtain and a second shutter curtain that are usually used in single-lens reflex cameras, the focal-plane shutter shields each line of the optical image that has passed through the shooting lens 202 in sequence and performs control of the exposure time and shielding. Reference numeral 105 indicates a shutter driving apparatus that drives the shutter 104. Reference numeral 106 indicates a first image sensor for obtaining an optical image of a subject formed using the shooting lens 202 as an image signal. The first image sensor 106 of the present embodiment is constituted by an XY addressing type of sensor such as a CMOS sensor, for example.

Reference numeral 107 indicates a first image capture signal processing unit. The first image capture signal processing unit 107 performs amplification processing on image signals output from the first image sensor 106, and A/D conversion processing for converting from analog to digital. Also, the first image capture signal processing unit 107 performs various types of correction processing, such as flaw correction, on the image data resulting from the A/D conversion, compression processing for compressing the image data, or the like. Reference numeral 108 indicates a first timing generation unit that outputs various timing signals to the first image sensor 106 and the first image capture signal processing unit 107.

Reference numeral 109 indicates a memory unit for temporarily storing image data and the like processed by the first image capture signal processing unit 107, and for permanently storing various adjustment values and programs and the like for executing various types of control performed by the overall control/computing unit 101. Reference numeral 110 indicates a storage medium control interface (I/F) unit for performing processing for storing image data and the like in a storage medium 111 or processing for reading out image data and the like from the storage medium 111. Reference numeral 111 indicates a detachable storage medium composed of a semiconductor memory or the like that stores various types of data such as image data.

Reference numeral 112 indicates a display driving unit that drives the display apparatus 113 that displays still images, moving images, and the like that have been shot. Reference numeral 114 indicates an external interface that exchanges information such as image signals and control signals with an external device such as a computer 115. Reference numeral 116 indicates a second image sensor that is a sensor with an RGB Bayer arrangement for acquiring an AE signal and a light source detection signal. A CCD with a global electronic shutter function is usually used, but a CMOS sensor may be used as long as it is a sensor that performs readout quickly (has a short readout time).

Reference numeral 117 indicates a second image capture signal processing unit. The second image capture signal processing unit 117 performs amplification processing on image signals output from the second image sensor 116, and A/D conversion processing for converting from analog to digital. Also, the second image capture signal processing unit 117 performs various types of correction processing, such as flaw correction on the image data resulting from the A/D conversion, compression processing for compressing the image data, and the like. Reference numeral 118 indicates a second timing generation unit that outputs various timing signals to the second image sensor 116 and the second image capture signal processing unit 117. Reference numeral 119 indicates a pentaprism that guides light beams deflected by the quick return mirror 102 to a finder (not shown) and the second image sensor 116.

Reference numeral 121 indicates a phase difference focus detection unit that receives light beams that have passed through the quick return mirror 102 and acquires a pair of images whose phases change according to the defocus amount of the subject, although this is not shown in the drawing. The focus detection unit 121 moves the shooting lens 202 by calculating the defocus amount of the subject based on the amount of shifting between the two images. Reference numeral 120 indicates a focus detection driving apparatus that drives the focus detection unit 121.

Figure 3:
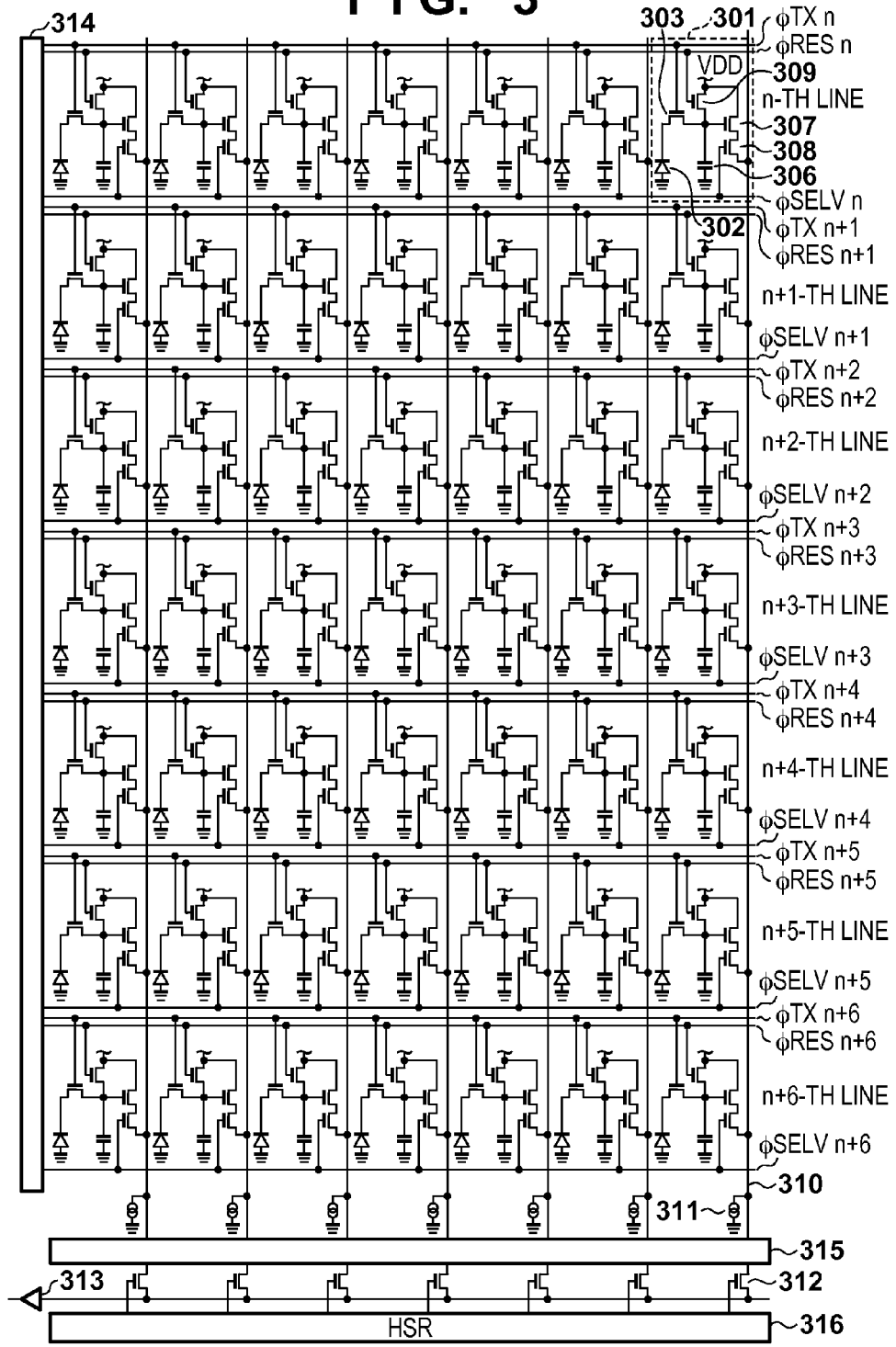
FIG. 3 is a diagram showing a configuration of an image sensor according to an embodiment.

FIG. 3 is a diagram showing the overall configuration of an image sensor arranged in the image capturing apparatus. This diagram shows a configuration of a first image sensor 106 that uses an XY addressing type of scanning method, and in which multiple pixels are arranged. In FIG. 3, reference numeral 301 indicates a first pixel, which is a unit for driving. Reference numeral 302 indicates a photodiode that converts light into charges (the photodiode will be referred to as "PD" hereinafter). Reference numeral 306 indicates a floating diffusion portion, which is a region in which the charges are temporarily accumulated (the floating diffusion portion will be referred to as "FD" hereinafter). Reference numeral 303 indicates a transfer switch for transferring charges generated by the PD 302 using a transfer pulse φTX to the FD 306. Reference numeral 307 indicates an amplification MOS amplifier that functions as a source follower. Reference numeral 308 indicates a selection switch that selects the pixel using a selection pulse φSELV. Reference numeral 309 indicates a reset switch that eliminates charges accumulated in the FD 306 using a reset pulse φRES.

Reference numeral 311 indicates a constant current source that is a load of the amplification MOS amplifier 307. Reference numeral 315 indicates a readout circuit that reads out the charges accumulated in the FD 306 of the pixel selected using the selection switch 308 as pixel data via a signal output line 310 after the charges have been converted into a voltage using charge-voltage conversion performed by the amplification MOS amplifier 307 and the constant current source 311. Reference numeral 312 is a selection switch for selecting pixel data (pixel signals) read out by the readout circuit 315, and is driven by a horizontal scanning circuit 316. Pixel data selected by the horizontal scanning circuit 316 is amplified by an output amplifier 313 and output from the first image sensor 106. Reference numeral 314 indicates a vertical scanning circuit for selecting switches 303, 308, and 309. Here, the n-th scan line selected by scanning using the vertical scan circuit 314 uses φTXn, φRESn, and φSELVn, and the n+1-th scan line uses φTXn+1, φRESn+1, and φSELVn+1 for φTX, φRES, and φSELV. For the sake of convenience of description, FIG. 3 shows the n-th to the n+6-th scan lines. Also, a "floating diffusion amplifier" is constituted by the FD 306, the amplification MOS amplifier 307, and the constant current source 311.

Figure 4:
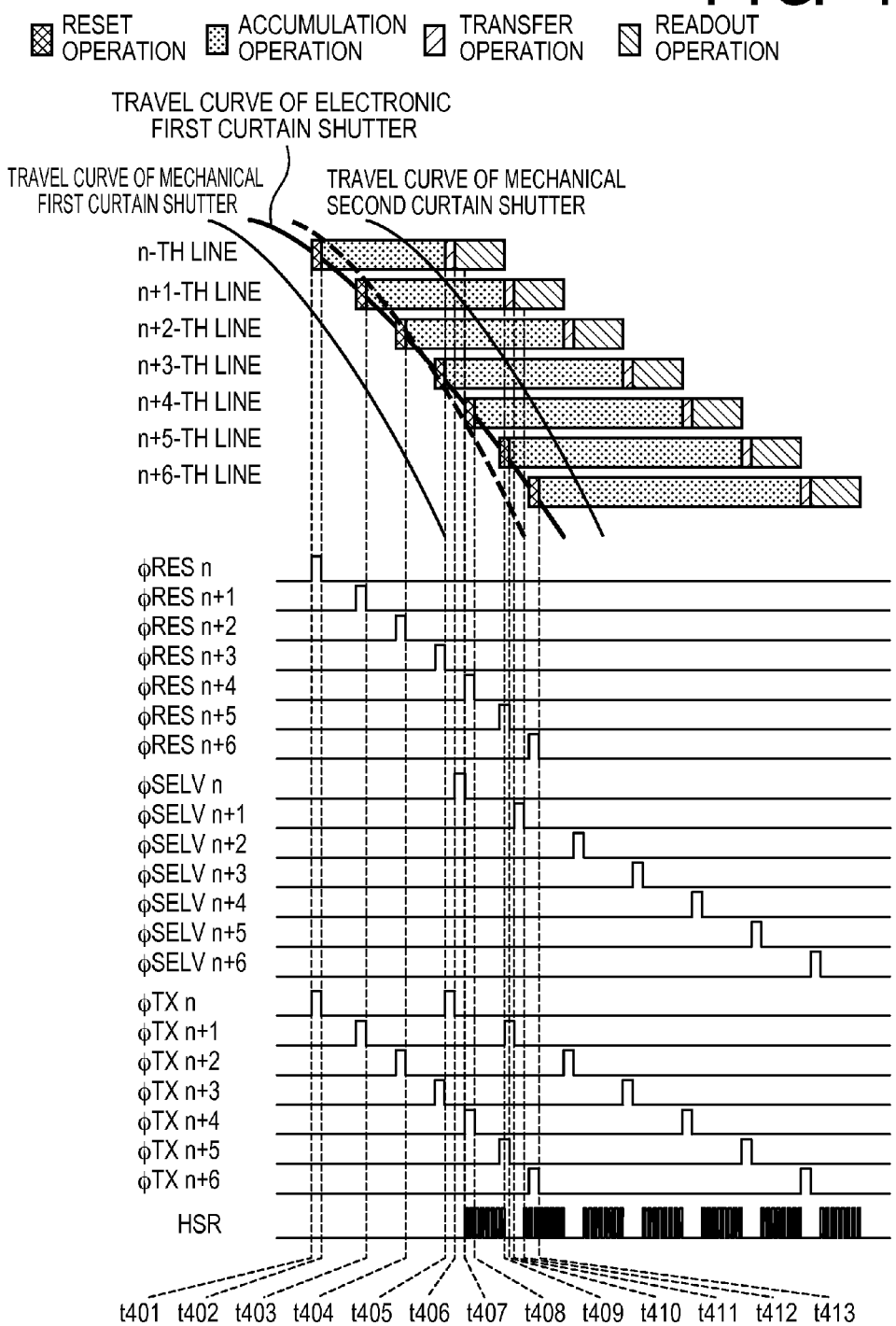
FIG. 4 is a timing chart showing a method for driving a digital shutter and a mechanical shutter.

Next, an electronic first curtain shutter operation for controlling the exposure amount of the first image sensor 106 using an electronic first curtain shutter and a mechanical second curtain shutter will be described with reference to FIG. 4. FIG. 4 is a sequence diagram showing operations performed by a solid-state image sensor that reads out image data and uses an electronic first curtain shutter and a mechanical second curtain shutter at a time of electronic first curtain shutter shooting to perform control such that the exposure amount is appropriate.

The mechanical first curtain shutter travels before the electronic first curtain shutter. The travel time matches the time when a photographer pushes a release button, and therefore the photographer is prevented from feeling discomfort caused by a release time lag.

First, in the operation of the electronic first curtain shutter, a pulse is applied to φRESn and φTXn in the n-th line so that the transfer switch 303 and the reset switch 309 are switched on in the period from time t401 to time t402. Accordingly, unneeded charges accumulated in the PD 302 and the FD 306 in the n-th line are eliminated, and thereby a reset operation is performed (reset time). Next, application of the pulse to φRESn and φTXn is stopped at time t402, whereby the transfer switch 303 and the reset switch 309 are switched off, and an operation for accumulating charges generated in the PD 302 of the n-th line is started.

Likewise, the accumulation operation for the n+1-th line is started at time t403, the accumulation operation for the n+2-th line is started at time t404, the accumulation operation for the n+3-th line is started at time t405, and the accumulation operation for the n+4-th line is started at time t408. Furthermore, the accumulation operation for the n+5-th line is started at time t410 and the accumulation operation for the n+6-th line is started at time t413. Thus, by sequentially stopping the resetting of a line and starting the operation for accumulating the charges, the operation of an electronic first curtain shutter is realized.

Subsequently, control is performed such that the exposure amount of each line is appropriate by causing the mechanical second curtain shutter to travel. Here, returning to the n-th line, a pulse is applied to φTXn in the period from time t405 to t406 so that the transfer switch 303 is switched on, and a transfer operation for transferring the charges accumulated in the PD 302 to the FD 306 is performed. After the transfer operation for the n-th line ends, a pulse is applied to φSELVn in the period from time t406 to t407 such that the selection switch 308 is switched on, whereby the charges held in the FD 306 are converted into a voltage and output to a readout circuit 315 as pixel data (pixel signal). Pixel data held temporarily in the readout circuit 315 is output in sequence by the horizontal scan circuit 316 starting from time t407. Then, readout of pixel data from the pixels in the n-th line ends at time t409.

In the n+1-th line, a pulse is applied to φTXn+1 in the period from time t409 to t411 so that the transfer switch 303 is switched on, and the transfer operation for transferring the charges accumulated in the PD 302 to the FD 306 is performed. After the end of the transfer operation for the n+1-th line, a pulse is applied to φSELVn+1 in the period from time t411 to t412 so that the selection switch 308 is switched on, whereby the charges held in the FD 306 are converted into a voltage and output to the readout circuit 315 as pixel data. Pixel data held temporarily in the readout circuit 315 is output in sequence by the horizontal scan circuit 316 starting from time t412. Then, readout of pixel data from the pixels in the n+1-th line ends at time t413. Thus, even if the external light varies during shutter travel, it is possible to set the exposure amount for each line to an appropriate amount by changing the exposure start time of the electronic first curtain shutter.

Figure 5:
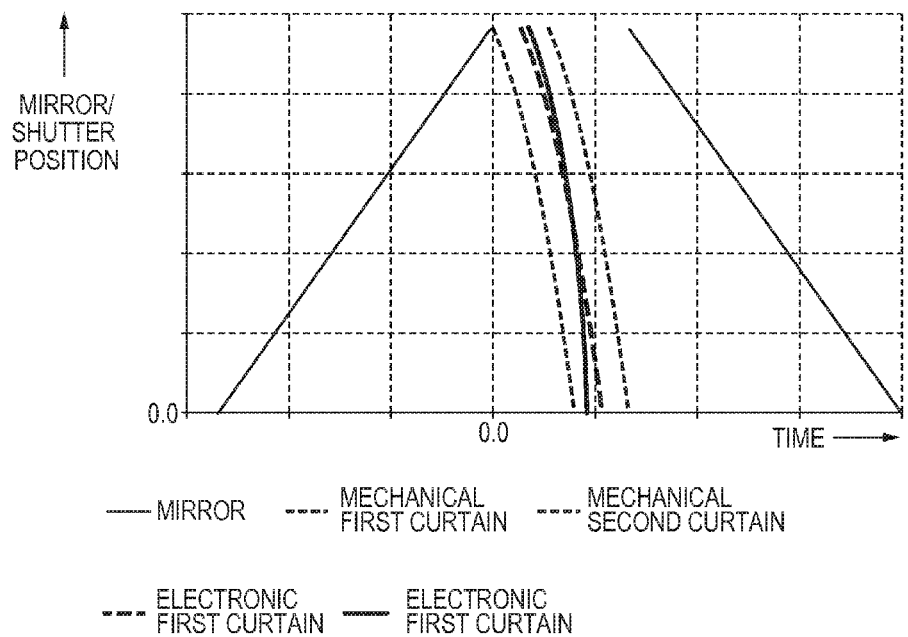
FIG. 5 is a diagram showing timings according to which a mirror, a mechanical shutter, and an electronic shutter operate.

FIG. 5 is a diagram showing the raising and lowering of the mirror and the traveling of the mechanical first curtain shutter, mechanical second curtain shutter, and electronic first curtain shutter. Here, the dotted line indicating the electronic first curtain shutter indicates a travel curve in a case where the external light does not vary, the solid line indicating the electronic first curtain shutter indicates a travel curve in the case where the external light varies in the manner of a flicker light source, and the broken lines indicate travel curves of mechanical shutters. As shown here, by changing the travel curve of the electronic first curtain shutter in correspondence with the variation of the external light, it is possible to correct the exposure time which has led to unevenness of exposure in prior technology.

Figure 6:
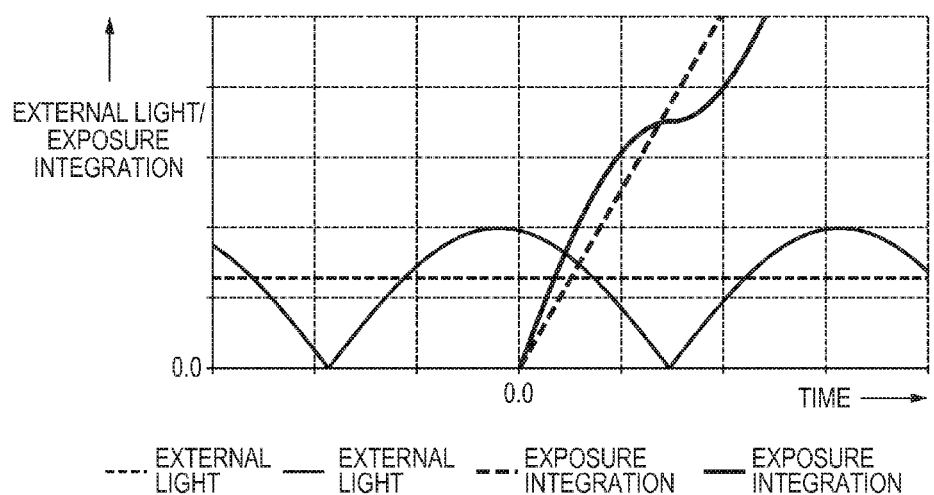
FIG. 6 is a diagram showing variation in external light and variation in an integrated exposure amount.

FIG. 6 is a diagram showing variation in the external light and variation when the exposed light amount is integrated, in which the dotted line indicates a case in which the external light does not vary and the solid line indicates a case in which the external light varies. These are the signals obtained from the second image sensor 116. As can be understood from FIG. 6, in the case of the dotted line, in which the external light does not vary, the integrated amount of exposed light increases linearly, and therefore the exposure amount in a predetermined amount of time is constant. In contrast, if the external light varies as indicated by the solid line, the accumulated exposure amount increases in a curved line, and therefore the amount of exposed light in a predetermined amount of time differs depending on the time.

Figure 7:
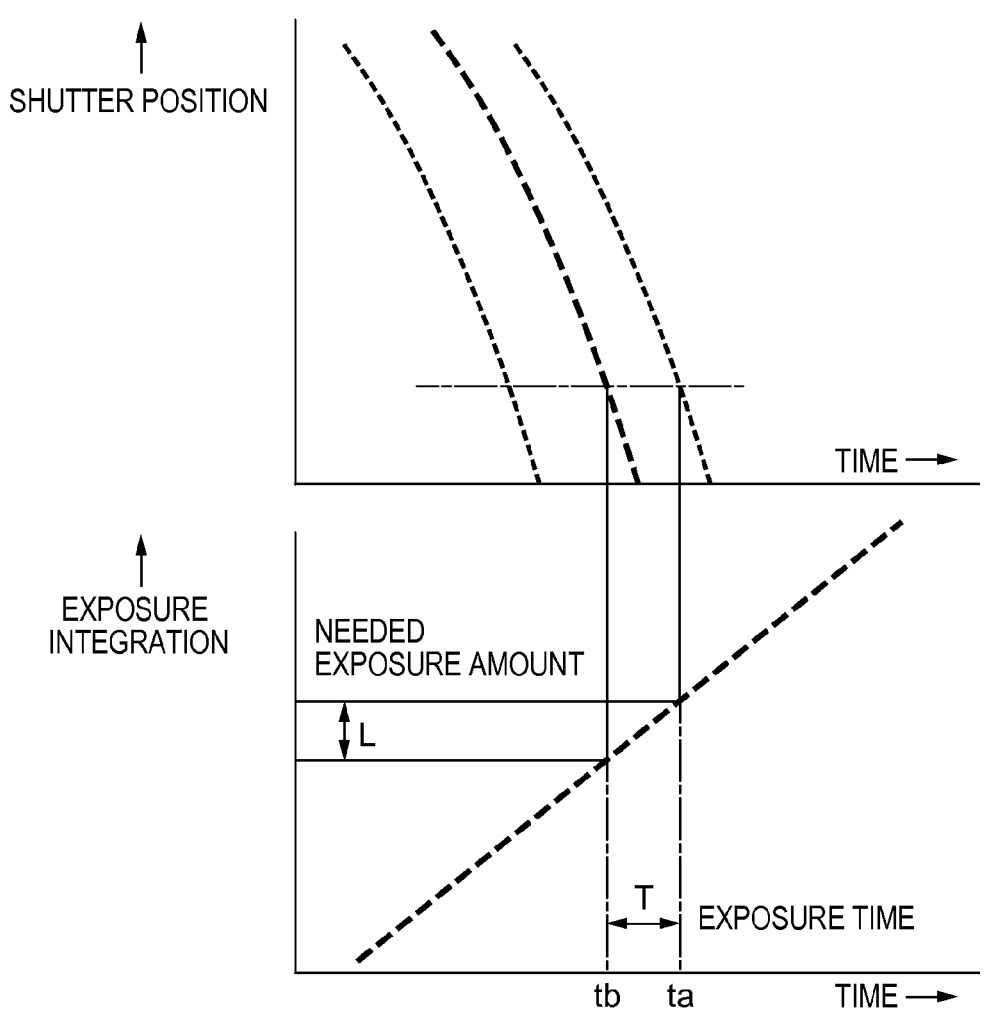
FIG. 7 is a diagram showing a relationship between a mechanical shutter, an electronic shutter, and an integrated exposure amount, according to an embodiment.

FIG. 7 shows the travel curve of a mechanical shutter as a broken line, the travel curve of the electrical first curtain shutter as a dotted line, and a straight line indicating the integrated exposure amount in the case where the external light does not vary. The integrated exposure amount is obtained from the signal of the second image sensor 116. The travel curves of the shutters are such that the mechanical first curtain travels first, the electronic first curtain travels subsequently, and thereafter exposure is started. Finally, the mechanical second curtain travels so as to suspend exposure.

Here, with focus given to a time to on the travel curve of the mechanical second curtain shutter that has been measured in advance, the time for the electronic first curtain shutter is tb in the case where the amount of exposure time is T. The needed exposure amount at this time is L, which is the same at any time on the travel curve of the mechanical second curtain shutter. For this reason, if the external light is constant and does not vary, the travel curve of the mechanical second curtain shutter and the travel curve of the electronic first curtain shutter have the same shape.

Figure 8:
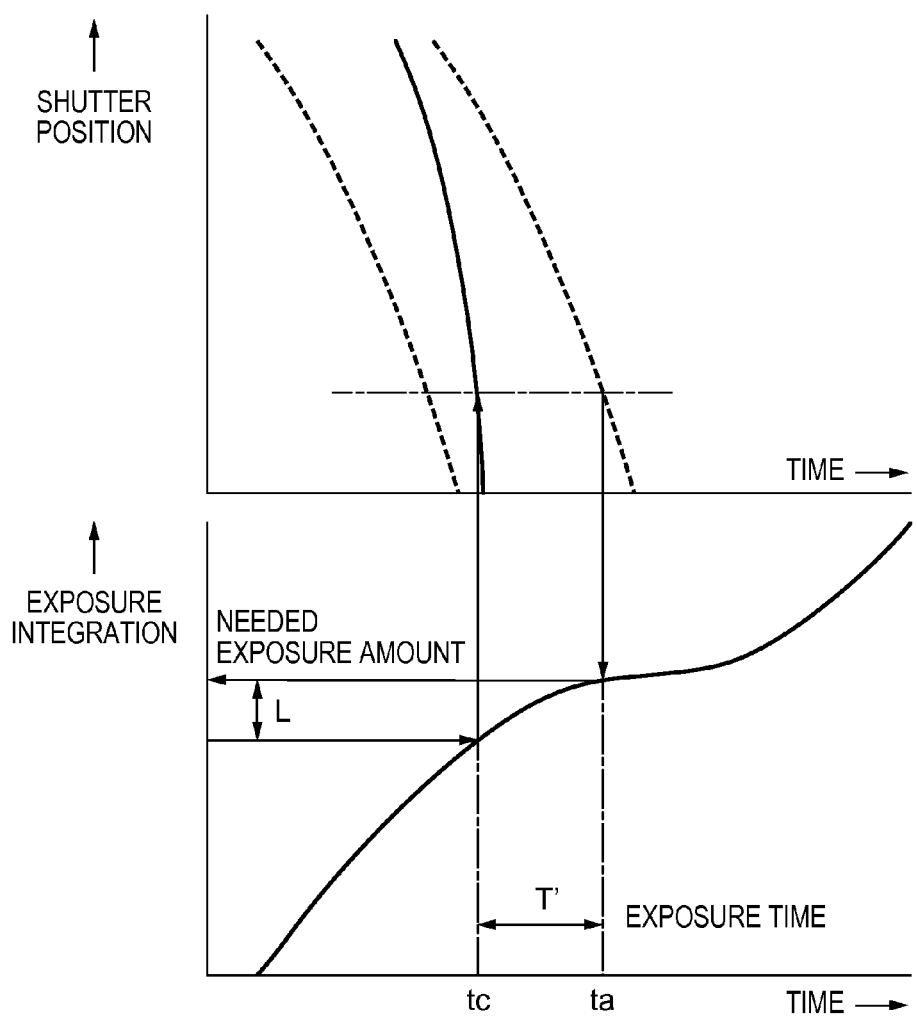
FIG. 8 is a diagram showing a relationship between the mechanical shutter, the electronic shutter, and an integrated exposure amount, according to an embodiment.

FIG. 8 shows the travel curves of mechanical shutters as broken lines, the travel curve of the electronic first curtain shutter as a dotted line, and a curved line indicating the integrated exposure amount in the case where the external light varies. The integrated exposure amount is obtained from the signal of the second image sensor 116. Similarly to FIG. 7, the travel curves of the shutters are such that the mechanical first curtain travels first, the electronic first curtain travels subsequently, and thereafter exposure is started. Finally, the mechanical second curtain travels so as to suspend exposure.

Here, with focus given to a time to on the travel curve of the mechanical second curtain shutter that has been measured in advance, based on the exposure amount L that is needed at this time, the time for the electronic first curtain shutter is tc, and the amount of exposure time is T'. As can be understood here, if the external light varies, the amount of time for T' needs to be obtained at all times of the electronic first curtain shutter in order to make the exposure amount for the entire image constant. Then, by controlling the travel curve of the electronic first curtain shutter using the amount of time for T', which changes at each time, it is possible to make the exposure amount for the entire image constant.

Note that if a portion of the image is extremely dark (if there is a time at which the light is turned off), a problem will occur in which the amount of time for T' increases only for that portion and the overall release time lag increases along with it. For that reason, in order to prevent the rhythm of shooting from being thrown off, the accumulation time T' needs to be cut off at a predetermined time.

Here, using the curved line of the integrated exposure amount (charge accumulation amount), a polynomial approximation for obtaining the exposure amount is calculated based on the time, and based on the polynomial approximation, the exposure amount is obtained based on the time. Similarly, a polynomial approximation for obtaining the time is calculated based on the exposure amount, and based on the polynomial approximation, the time is obtained based on the exposure amount, and it is thereby possible to simplify the calculation operation.

Figure 9:
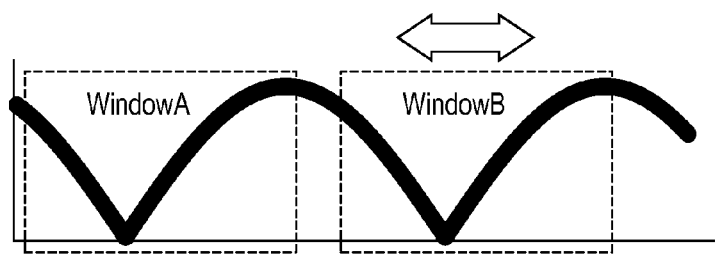
FIG. 9 is a diagram showing a method for detecting periodicity in varying external light.

FIG. 9 is a diagram for describing an example of a method for detecting the periodicity of external light variation obtained using the signal of the second image sensor 116. With respect to a result of sampling of the external light variation indicated by the gray line for a certain period of time, the degree of coincidence between the waveform of WindowA and the waveform of WindowB is obtained. The degree of coincidence is obtained by finding the sum of the absolute values of the differences between the waveforms, for example. Then, WindowB is moved so as to obtain the degree of coincidence (autocorrelation). The period of the periodic external light variation is obtained when the degree of coincidence is the maximum (when the sum of the absolute values is the minimum) (period detection). The external light variation for the time when the shutters travel is predicted based on the period obtained here, and the integration curve of the exposure is obtained.

As described above, according to the above-described embodiment, unevenness of exposure in a shot image is not corrected using gain, and therefore blown-out highlights and S/N ratio deterioration do not occur. Also, since the mechanical first curtain shutter travels before the electronic first curtain shutter travels, the mechanical shutters travel at the time when the photographer releases the shutter, and the photographer does not feel discomfort caused by a shutter time shift.

With that, a preferred embodiment of the present invention has been described, but the present invention is not limited to this embodiment, and various modifications and changes can be made without straying from the gist of the invention.

For example, the present embodiment described a configuration in which exposure control is performed using an electronic first curtain shutter and a mechanical second curtain shutter, but it is possible to use a configuration in which exposure control is performed using an electronic first curtain shutter and an electronic second curtain shutter. In such a case, it is sufficient that the exposure amount of the entire image is made constant by performing control of the travel curve of the electronic second curtain shutter using a method similar to the control of the travel curve of the electronic first curtain shutter described in the present embodiment. Alternatively, it is sufficient that the exposure amount of the entire image is made constant using a combination of the travel curve of the electronic first curtain shutter and the travel curve of the electronic second curtain shutter.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126585, filed Jun. 19, 2014, which is hereby incorporated by reference herein in its entirety.

What is claimed is:

1. An image capturing apparatus, comprising:
an XY addressing type of image sensor having a plurality of pixels;
a focal plane shutter having a mechanical second curtain shutter configured to perform shielding such that light receiving in the pixels of the image sensor is suspended in sequence;
an electronic first curtain shutter configured to reset the pixels in each line in sequence before the mechanical second curtain shutter travels, and to cause accumulation of charges in the pixels to start;
at least one processor; and
a memory storing instructions which cause the at least one processor to perform operations of a detection unit, a period detection unit, a prediction unit and a control unit, wherein:
the detection unit is configured to detect brightness of light from an object;
the period detection unit is configured to detect periodic variation in a light amount by sampling light from the object for a certain period of time using the detection unit;
the prediction unit is configured to, based on the period of the variation in the light amount of light from the object detected by the period detection unit, predict variation in the light amount in a predetermined exposure time; and
the control unit is configured to control a reset time of the electronic first curtain shutter such that charge accumulation amounts of the pixels of each line fall within a predetermined range according to the variation in the light amount predicted by the prediction unit.

2. The image capturing apparatus according to claim 1, wherein variation in light from the object is integrated, a curved line formed using the exposure amounts and the exposure time of each line of the image sensor is calculated, and the exposure time needed for each line is obtained based on the curved line.

3. The image capturing apparatus according to claim 2, wherein the needed exposure time is obtained by approximating the curved line of the exposure time and the exposure amounts using a polynomial equation.

4. The image capturing apparatus according to claim 1, wherein a degree of coincidence obtained by autocorrelation is used to detect periodic variation in light from the object based on the data obtained by sampling light from the object using the detection unit for a certain period of time.

5. The image capturing apparatus according to claim 2, wherein if the exposure time needed for the respective lines of the image sensor is longer than a predetermined value, the control unit performs control such that the needed exposure time is not longer than the predetermined value.

6. An image capturing apparatus comprising:
an image sensor;
a mechanical shutter;
at least one processor; and
a memory storing instructions which cause the at least one processor to perform operations of an accumulation control unit, a first detection unit and a second detection unit, wherein:
the accumulation control unit is configured to cause accumulation of charges to start in each region of the image sensor in sequence, before the mechanical shutter travels in a direction of shielding the image sensor against light;

the first detection unit is configured to detect brightness of light from an object; and the second detection unit is configured to detect periodic variation in a light amount of light from the object based on a result of detection performed by the first detection unit, wherein based on the periodic variation detected by the second detection unit, the accumulation control unit sets the charge accumulation start times for the respective regions of the image sensor such that a region with an exposure time of a different length exists among the plurality of regions in the image sensor.

7. The image capturing apparatus according to claim 6, wherein based on the periodic variation detected by the second detection unit, the accumulation control unit changes a shape of a curve indicating a shift in the charge accumulation start times for the respective regions of the image sensor.

8. A method for controlling an image capturing apparatus that includes a detection unit configured to detect brightness of external light, an XY addressing type of image sensor having a plurality of pixels, a focal plane shutter having a mechanical second curtain shutter configured to perform shielding such that light receiving in the pixels of the image sensor is suspended in sequence, and an electronic first curtain shutter configured to cause accumulation of charges in the pixels to start by resetting the pixels in each line in sequence before the mechanical second curtain shutter travels, the method comprising:

a period detection step of detecting periodic variation in a light amount by sampling external light for a certain period of time using the detection unit;

a prediction step of, based on the period of the variation in the light amount of the external light detected in the period detection step, predicting variation in the light amount in a predetermined exposure time; and a control step of controlling a reset time of the electronic first curtain shutter such that the charge accumulation amounts of the pixels of each line fall within a predetermined range, according to the variation in the light power of the external light predicted in the prediction step.

9. The method for controlling the image capturing apparatus according to claim 8, wherein variation in the external light is integrated, a curved line formed using the exposure amounts and the exposure time of each line of the image sensor is calculated, and the exposure time needed for each line is obtained based on the curved line.

10. The method for controlling the image capturing apparatus according to claim 9, wherein the needed exposure time is obtained by approximating the curved line of the exposure time and the exposure amounts using a polynomial equation.

11. The method for controlling the image capturing apparatus according to claim 8, wherein a degree of coincidence obtained by autocorrelation is used to detect periodic variation in external light based on the data obtained by sampling the external light using the detection unit for a certain period of time.

12. The method for controlling an image capturing apparatus according to claim 9, wherein if the exposure time needed for the respective lines of the image sensor is longer than a predetermined value, control is performed in the control step such that the needed exposure time is not longer than the predetermined value.

13. A method for controlling an image capturing apparatus including an image sensor, a mechanical shutter, and an accumulation control unit configured to cause accumulation of charges to start in each region of the image sensor in sequence before the mechanical shutter travels in a direction of shielding the image sensor, the method comprising:

detecting brightness of light from the object;

detecting periodic variation in a light amount of light from the object based on a result of detecting brightness of light from the object; and setting the charge accumulation start times for each respective region of the image sensor such that a region with an exposure time of a different length exists among the plurality of regions in the image sensor, based on the detected periodic variation.

14. The control method according to claim 13, wherein a shape of a curve indicating a shift in the charge accumulation start times of the respective regions of the image sensor is changed based on the periodic variation in the light amount of light from the object.

15. A non-transitory computer-readable storage medium storing a program for causing a computer to execute the steps of the control method according to claim 8.

16. A non-transitory computer-readable storage medium storing a program for causing a computer to execute the steps of the control method according to claim 13.

* * * * *